United States Patent [19]

Singh et al.

[11] Patent Number: 4,995,090
[45] Date of Patent: Feb. 19, 1991

[54] OPTOELECTRONIC PATTERN COMPARISON SYSTEM

[75] Inventors: Jasprit Singh, Ann Arbor, Mich.; Songcheol Hong, Seoul, Rep. of Korea

[73] Assignee: The University of Michigan, Ann Arbor, Mich.

[21] Appl. No.: 307,669

[22] Filed: Feb. 7, 1989

[51] Int. Cl.$^5$ .................... G06K 9/74; G06K 9/38
[52] U.S. Cl. .................................. 382/50; 382/32
[58] Field of Search .......................... 382/32, 30, 50

[56] References Cited

U.S. PATENT DOCUMENTS

| | | | |
|---|---|---|---|
| 3,085,226 | 4/1963 | Brown | 382/32 |
| 3,267,430 | 8/1966 | Howard | 382/32 |
| 3,550,119 | 12/1970 | Rabinow | 382/32 |
| 4,119,946 | 10/1978 | Taylor | 382/30 |
| 4,250,488 | 2/1981 | Haupt | 382/50 |
| 4,491,962 | 1/1985 | Sakov et al. | 382/50 |

*Primary Examiner*—Leo H. Boudreau
*Assistant Examiner*—Michael R. Cammarata
*Attorney, Agent, or Firm*—Rohm & Monsanto

[57] ABSTRACT

A system for comparing a subject image against a reference image for determining the closeness of match, or against a plurality of reference images for determining the one of the reference images which corresponds to the closest match. The closest match is determined in response to the extrema of light transmitted through complementary versions of the images. More specifically, the present system compares the true subject image against the complement of each reference image, and the complement of the subject image against each true reference image. Alternatively, the true subject image is compared against each true reference image, and the complement of the subject image against each complement reference image. The particular reference image which achieves a preselected minimum or maximum of transmitted light for each such comparison is selected as the image which most closely matches the subject image. The comparison scheme is useful in comparing very large images by comparing only preselected image portions at one time. The comparisons can be achieved using transparencies of the subject and reference images, and their complements. Alternatively, the comparisons can be performed on a pixel-by-pixel basis, using arbitrarily small pixels, in a video embodiment. Any combination of the subject and the reference images can be generated as video images, either from a recording or in real time, using the outputs of video cameras.

6 Claims, 6 Drawing Sheets

OPTOELECTRONIC PATTERN COMPARISON SYSTEM

BACKGROUND OF THE INVENTION

This invention relates generally to systems for comparing patterns, and more particularly, to a method and apparatus for comparing true and complement images of a subject pattern against true and complement images of a plurality of stored patterns, and ascertaining the one of the stored patterns which most closely matches the subject pattern. A one to one comparison can also be made to find how closely matched a subject pattern is to a reference pattern.

There is a need in the fields of pattern recognition, error correction, associative memory, computer vision, artificial intelligence systems, and other disciplines for a simple and economical system which reliably can recognize patterns. In addition to pattern recognition, such a system preferably should function as associative memory for one-dimensional and two-dimensional information.

In the optical domain, the prior art has endeavored to achieve the benefits of the invention herein using match filtering techniques. Such techniques, however, suffer from insufficient sensitivity, and are entirely inadequate for analysis of digitized patterns. In the practice of matched filtering techniques, images are transformed into Fourier space and compared against another transformed image. Spatial correlation is carried out after a search for steepest gradient allows selection of the best match.

Techniques based on neural networks have been suggested in the prior art for accomplishing associative memory tasks. These techniques, however, in addition to being cumbersome and difficult to use, suffer from the further drawback of having low storage capacity even with state-of-the-art devices. Neural network concepts have been employed in optical and optoelectronic architectures for recognition and associative memory. In the implementation of such systems, a predetermined number of stable vectors are stored using a connectivity mask. An integrating threshold feedback scheme permits an incorrect vector to modify itself to achieve similarity with a stored stable vector. Although this approach is applicable to two-dimensional patterns, the connectivity mask requires a four-dimensional system, rendering this type of system to be difficult to implement.

A number of techniques are known in the prior art for achieving pattern recognition using software. These software-based pattern matching systems suffer from the drawback that they are quite slow in their operation and have poor resolution. Moreover, software-based approaches require expensive and complex computer systems in their operation.

It would appear that the best match would be found by a direct comparison of the subject image with each of a set of stored reference images. Thus, for example, if an image on a first transparency is superimposed on its complement image on a second transparency, the resulting image would allow only minimum light to pass through both transparencies. Conversely, if an image on a transparency is placed on a copy of itself, maximum light would pass through. It is, however, a problem with this approach that if a totally blackened sheet were placed on the image, the output light would still be minimum, while in the second case, if a totally transparent sheet is placed on the test image, maximum light would pass through. Thus, the determination of whether the light passing through the transparencies is a maximum or minimum is not indicative of a match actually having been found. Thus, a spatial correlation is required if direct images are to be matched.

It is, therefore, an object of this invention to provide a simple, economical, and high speed system for comparing a subject pattern against plural stored reference patterns, and ascertaining the closest match.

It is another object of this invention to provide a system for comparing an electronically recorded subject image against a plurality of reference images stored on transparencies, and ascertaining the closest match.

It is additionally an object of this invention to determine the closeness of match between a subject image and a single reference image.

It is also an object of this invention to provide a system for comparing an electronically recorded subject image against a plurality of reference images stored electronically, and ascertaining the closest match.

It is a further object of this invention to provide a system for comparing an image stored on a transparency against a plurality of reference images stored electronically, and ascertaining the closest match.

It is additionally an object of this invention to provide a system which provides a reliable indication of a match between a plurality of patterns.

It is yet a further object of this invention to provide a system which provides a reliable indication of a match between a plurality of patterns, without need of a pixel-by-pixel computer analysis. The pixel being the smallest resolution of the image, can be arbitrarily small in this approach without reducing the capabilities of the system.

It is also another object of this invention to provide a system which provides a reliable indication of a match between a plurality of patterns which is very fast, and therefore can be employed to find a match to a subject image in a large reference pattern library.

It is yet an additional object of this invention to provide a system which provides a reliable indication of a match between a plurality of patterns without need of observation of the patterns by a human operator.

It is still another object of this invention to provide a system which permits a large number of reference images to be stored and made available quickly for comparison with the subject image.

It is a yet further object of this invention to provide a system for comparing images, wherein the comparison is achieved in an extremely short period of time.

It is also a further object of this invention to provide a system for comparing images which contain gray scales.

It is additionally another object of this invention to provide an edge detection system.

A still further object of this invention is to provide a system wherein a best match between a subject image and a one of a plurality of reference images is easily ascertained by determining a mathematical extrema.

An additional object of this invention is to provide a system wherein a best match between a subject image and a one of a plurality of reference images is easily ascertained by determining a gross transmission light level.

Yet another object of this invention is to provide a system wherein a subject image can be compared to a plurality of stored reference images simultaneously.

SUMMARY OF THE INVENTION

The foregoing and other objects are achieved by this invention which provides, in a system aspect of the invention, an arrangement for comparing a subject pattern to be tested against at least one known pattern. It is to be noted that the technique described below also allows the determination of the closeness of match between a subject image and a reference image and whether or not the closeness is within a predetermined range. In accordance with the invention, a light source is arranged to propagate a light through a plurality of pattern storage devices to a photodetector which receives the output light after such propagation. A first of the pattern storage devices stores the subject pattern to be compared, a second such pattern storage device stores a complement of the subject pattern to be compared, a third pattern storage device stores a known pattern, and a fourth pattern storage device stores a complement of the known pattern. In the operation of the invention, a support holds the first and fourth pattern storage devices in alignment with one another for propagation of the light therethrough. Subsequently, the second and third pattern storage devices are supported in alignment with one another, also for the purpose of propagating the light from the light source therethrough. It is also possible to determine the best match of light propagated through the first and third storage devices and through the second and fourth storage devices. In the former case the best match is determined by a minima while in the latter case the best match is obtained by a maxima as described below. We will henceforth discuss the former case only.

In a specific embodiment of the invention, the pattern storage devices are transparencies. The best match is achieved when it is determined which of the reference patterns yields a minimum total light through both combinations of transparency pairs. The determination of minimum light propagation can be made using an integrating threshold device coupled to the photodetector. Either the light output of the light source can be varied, or the trigger threshold can be adjusted electronically. By determining during variation of either of these parameters the point at which the integrating threshold device triggers, one can ascertain whether the positive-complement pair of a given reference pattern achieves minimum light propagation, thereby corresponding to the closest match. In the practice of a specific illustrative embodiment of the invention, the subject image and its complementary image may be arranged on an integrated transparency sheet, and similarly, the reference image and its complementary image may be disposed on a further integrated transparency sheet.

In accordance with a method aspect of the invention, a method of ascertaining a match between a subject pattern and a reference pattern, wherein the reference pattern is one of a plurality of stored and available reference patterns, employs the steps of optically aligning a positive image of the subject pattern with a negative image of one of the plurality of reference patterns; propagating a light through the optically aligned positive image of the subject pattern and the negative image of the one of the plurality of reference patterns; obtaining a measure of the amount of the light propagated through the optically aligned positive image of the subject pattern and the negative image of one of the plurality of reference patterns, and repeating these steps in parallel for each of the negative images of the plurality of reference patterns. Subsequently, the further steps of further optically aligning a negative image of the subject pattern with a positive image of one of the plurality of reference patterns, further propagating a further light through the optically aligned negative image of the subject pattern and the positive image of one of the plurality of reference patterns, and further obtaining a measure of the amount of the further light propagated through the optically aligned negative image of the subject pattern and the positive image of the one of the plurality of reference patterns, are conducted. The further steps are repeated, and the closest match of the reference patterns corresponding to the positive and negative images which resulted in minimum light propagation in the steps of obtaining a measure and further obtaining a measure is selected as the closest match to the subject pattern.

In accordance with a specific embodiment of the method aspect of the invention, the steps of optically aligning and further optically aligning are performed simultaneously, and the steps of propagating and further propagating are also performed simultaneously. This is preferable in embodiments of the invention where the true and complement images of the patterns are stored on the same device, such as an integrated transparency.

In a highly advantageous aspect of the invention, the images on the transparencies are not necessarily limited to black on white or white on black, but rather can be a first pure wavelength color foreground on a background of a second pure wavelength color. In such an embodiment, a complement image would be of the second color on a background of the first color. In such an embodiment, the light which is propagated through the optically aligned patterns is a composite light which may contain components of the first and second colors. This significantly simplifies the testing procedure because the first color component in the propagated light sees a positive subject image, but a negative reference image, while the second color component sees a negative subject image aligned with a positive reference image. Thus, with only one illumination, both the true-complement and the complement-true tests are conducted simultaneously. In such an embodiment of the invention, the monitoring of the propagated light is performed on the various color components themselves. Preferably, the first and second colors are pure wavelength colors, for example red, blue, or green, and further preferably in equal proportions so as to originate as white light. However, in some simple specific cases it may not be required to have pure wavelength colors.

Further in accordance with this method aspect of the invention, the step of obtaining a measure of the transmitted light comprises the step of varying the amplitude of the light. Alternatively, a trigger threshold, illustratively of an integrating threshold device, as discussed hereinabove, is varied.

Moreover, in a specific illustrative embodiment of the invention, prior to performing the steps of optically aligning and further optically aligning, there is provided the further step of generating the positive and negative images of the subject pattern on a video screen. Such a screen may be a conventional phosphor-type system in which the image is produced as a light emission from a phosphor, or a liquid crystal display screen may be employed. For very high speed matching, the subject image and reference images could be places on real time programmable transparencies prior to carrying out the light propagation. Alternatively, one of the subject or reference images could be on a video screen while the other could be on a programmable transparency.

In accordance with a further method aspect of the invention, a method of comparing a subject image against a plurality of stored reference images for selecting a one of the stored reference images which most closely matches the subject image comprises the steps of producing the subject image on a further transparent screen, the subject image being of a first color on a background of a second color; producing sequentially each of the plurality of stored reference images on a second transparent screen, the produced reference images being of the second on a background of the first color; propagating a light through the first and second transparent screens; and determining which of the produced reference images resulted in the minimum transmission of the light through the first and second transparent screens.

In a specific embodiment of the further method aspect of the invention, the step of propagating a light comprises the further step of propagating components of light corresponding to the first and second colors. In such an embodiment, the step of determining comprises the further step of measuring component colors of the light. As previously discussed, the step of determining the amount of light propagated through the screens may include the further step of adjusting a trigger threshold of a light-sensitive device, or adjusting a predetermined characteristic of the source of light, such as total light amplitude. Also, the subject image and/or reference images can be generated on a video screen.

BRIEF DESCRIPTION OF THE DRAWINGS

Comprehension of the invention is facilitated by reading the following detailed description, in conjunction with the annexed drawing, in which.

DETAILED DESCRIPTION

Figure 1:
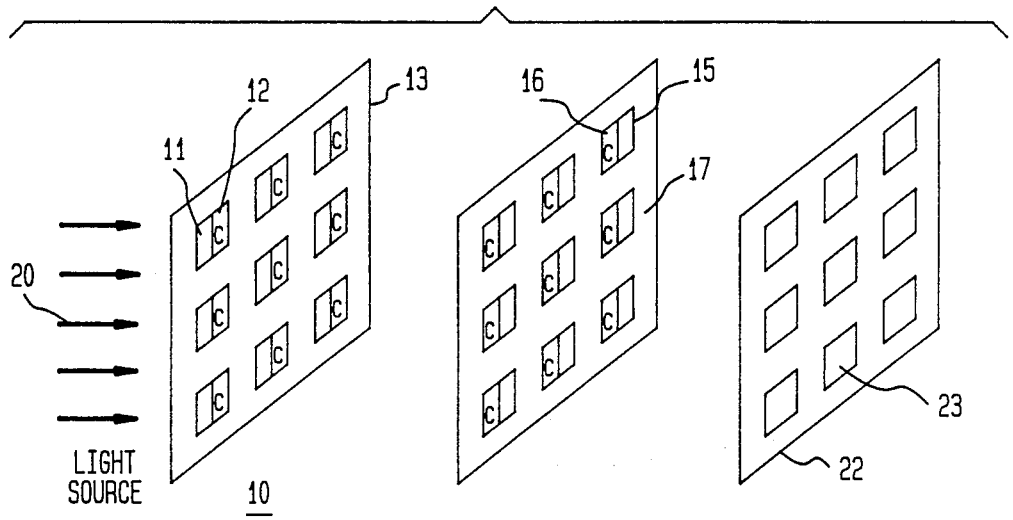
FIG. 1 is a simplified, partially schematic representation of an architecture constructed in accordance with the principles of the invention for comparing a subject image simultaneously against a plurality of stored reference images.

The present invention utilizes, in a specific embodiment thereof, an optoelectronic architecture which is capable of identifying the closest match between a subject image and a plurality of stored, or reference, images. All of said images may be either one-dimensional or two-dimensional. This technique is also applied to finding the closeness of a subject image to a single reference image and to determine whether or not the closeness is better than a predetermined standard. In the practice of the present invention, an integrating threshold device (I/T) is employed, having the following characteristic:

if $I_{in} \geq I_{th}$ → the state of the integrating threshold
device is On (Off)

if $I_{in} < I_{th}$ → the state of the integrating threshold
device is Off (On)

where $I_{in}$ is the intensity of the incoming light, and $I_{th}$ is the threshold intensity. Accordingly, if the input intensity falls below $I_{th}$, the state of the integrating threshold device, as represented electronically or optically, changes. Devices having such a characteristic are well known in the art and are commercially available.

In describing the inventive concept herein, the present analysis will be presented in the context of a comparison between a subject, or test, image and a plurality M of reference images which are stored, and obtaining a signature in the comparison which is indicative of the particular one of the M stored reference image which corresponds to the closest match with the subject image. In the present illustrative embodiment, a direct pixel-by-pixel comparison is conducted, thereby affording the advantages of a detailed comparison as well as a completely parallel identification of the best matched image.

In order to obtain a conceptual understanding of the system architecture which is proposed herein, the pixel-by-pixel comparison of a subject image is carried out against the $m^{th}$ one of the plurality of stored reference images. Let $t^{ij}$ represent the transmittance of the ij pixel of the subject image and $T^m_{ij}$ the transmittance of the $m^{th}$ stored image, wherein both, the subject and reference images have $n \times n = N$ pixels which have transmittance and are digital. The transmittances are either $t_{min}$ or $t_{max}$ for the subject image, or $T_{min}$ or $T_{max}$ for the stored images. When a pixel of the subject image is compared against the complement of the stored image, the following four combinations are possible:

[$t_{max}$, $T_{max}$]; [$t_{max}$, $T_{min}$]; [$t_{min}$, $T_{max}$]; and [$t_{min}$, $T_{min}$].

For the $m^{th}$ stored image, let:

$n_1^m$ = no. of pixels where the matching is [$t_{max}$, $T_{max}$];
$n_2^m$ = no. of pixels where the matching is [$t_{max}$, $T_{min}$];
$n_3^m$ = no. of pixels where the matching is [$t_{min}$, $T_{max}$]; and
$n_4^m$ = no. of pixels where the matching is [$t_{min}$, $T_{min}$].

Since the comparison is of the true, or positive, subject image against the complement, or negative, of the $m^{th}$ stored image, it is noted that:

$n_1^m + n_4^m = N_w$, where $N_w$ is the number of wrong (mismatched) pixels, since this corresponds to the comparison of images which are of the same type, i.e., true-true or complement-complement; and $n_2^m + n_3^m = N_c$, where $N_c$ is the number of correct (matched) pixels, since this corresponds to the comparison of images which are of opposite types, i.e., true-complement or complement-true.

As previously noted, what is sought is a signature which has either a maximum or a minimum (extrema) characteristic for the best match (i.e., for $N_c$ maximum), whereby for a particular stored reference image, an extrema can easily be detected. As can be seen, the light collected from the direct comparison of the subject image and the complement of the $m^{th}$ stored image is:

$$I_1^m = I_O[n_1^m t_{max} T_{max} + n_2^m T_{max} T_{min} + n_3^m t_{min} T_{max} + n_4^m t_{min} T_{min}] \quad \text{Eq. 1}$$

where $I_O$ is the incident light through each pixel. It should be noted that the passing light multiplies the transmittances.

This collected light does not have the desired property of being an extrema for the best match. Evaluating the light which is collected after passage through the complement of the subject image and the $m^{th}$ stored image, one obtains:

$$I_{II}^m = I_O[n_4^m t_{max} T_{max} + n_2^m t_{min} T_{max} + n_3^m t_{max} T_{min} + n_1^m t_{min} T_{min}] \quad \text{Eq. 2}$$

Upon collecting $I^m{}_I$ and $I^m{}_{II}$, one obtains:

$$I_{tot}^m = I_I^m + I_{II}^m \quad \text{Eq. 3}$$

$$= I_O[(n_1^m + n_4^m) t_{max} T_{max} + (n_2^m + n_3^m)(t_{min} T_{max} + t_{max} T_{min}) + (n_1^m + n_4^m) t_{min} T_{min}]$$

or $$I_{tot}^m = I_O N_W^m (t_{max} T_{max} + t_{min} T_{min}) + I_O N_C^m (t_{max} T_{min} + t_{min} T_{max}) \quad \text{Eq. 4}$$

Now, using the aforementioned definition of correct and wrong pixels in the direct matching, one obtains the following simple relationship:

$$T_{max}(t_{max} - t_{min}) - T_{min}(t_{max} - t_{min}) > 0, \quad \text{Eq. 5}$$

since $t_{max} > t_{min}$, $T_{max} > T_{min}$ or, $$t_{max} T_{max} + t_{min} T_{min} > t_{min} T_{max} + t_{max} T_{min}$$

It therefore is clear that the sum of Eq. 4 is minimum for the particular stored image, for example the $l^{th}$ image, for which $N^l{}_w$ is minimum, i.e., for the best match. The system of the present invention implements the foregoing concept. It is significant to note, however, that the present invention can be employed by determining a maximum light level, rather than the minimum light level. More specifically, if the output from the comparison of the true subject image and the true reference image is summed with the output of the comparison of the complement of the subject image and the complement of the reference image, then the best match occurs for the maximum light level. However, for purposes of the present specific illustrative embodiment, the system utilizing minimum light level to determine the best match will be described herein. Persons of skill in the art will, in light of the teaching herein, be able to practice the alternative embodiment.

FIG. 1 is a simplified representation of a transparency system 10 wherein a subject image 11 and its image complement 12 are replicated nine times on a subject image transparency sheet 13. In this figure, the complement images are illustrated with a "C" thereon and it can be seen that the subject image and its complement image are situated in this specific illustrative embodiment alongside one another.

A plurality of stored reference images 15 and their reference complement images 16 are arranged on a reference image transparency sheet 17. In this embodiment, unlike the subject image which is replicated multiple times on transparency sheet 13, the reference images may be different from one another on the reference image transparency sheet. In addition, it is to be noted that the reference complement images are arranged on the opposite side, as compared to the subject complement image on transparency sheet 13. In this manner, when transparency sheets 13 and 17 are aligned on one another, each subject image 11 will be arranged to register with a respective one of reference complement images 16, and the subject complement image 12 will register with a respective reference image 15. Thus, images of opposite types are the ones compared to each other.

A light 20 from a light source (not shown) is directed to propagate through transparency sheets 13 and 17 and to an array 22 of integrating threshold devices 23. As described hereinabove, in this specific embodiment, the particular one of integrating threshold devices 23 which receives the minimum light will have received the light which was propagated through the closest matching one of the reference images.

Figure 2:
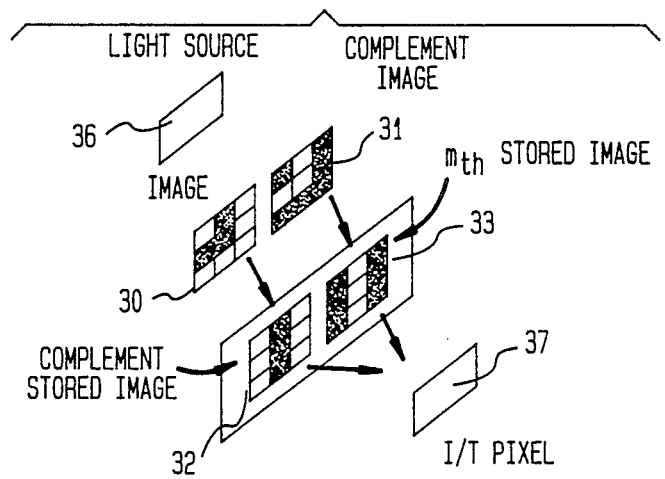
FIG. 2 is a simplified, partially schematic representation of an arrangement for comparing a subject image against one of a plurality of stored reference images, substantially on a pixel-by-pixel basis.

FIG. 2 is a simplified schematic representation of a system for comparing a subject image to a one of a plurality of stored images, substantially on a pixel-by-pixel basis. The pixel is the smallest grain size of the image and could be arbitrarily small without affecting the speed of comparison. As shown in this figure, a subject image 30 and its complement image 31 are arranged to register optically with a complement reference image 32 and a corresponding true reference image 33, respectively. A light source 36 produces a light which is propagated through the images to an integrating threshold device 37. In this specific embodiment, subject image 30 may be but a portion, or a pixel, of a larger image. Thus, the system of the present invention can be used to produce highly detailed comparisons of relatively large images.

In the embodiment of FIGS. 1 and 2, conventional optoelectronic and lens systems which are well known in the art and which preferably are to be used in the practice of the present system are not shown for sake of clarity. However, persons of skill in the art can configure such optical systems, and a description of such systems in this disclosure is deemed not to be necessary. Also in the embodiments of FIGS. 1 and 2, a number of techniques can be applied to ascertain the relative amount of light propagated through the images. In one specific embodiment, the light output of the light source can be varied in time, or alternatively, the threshold value for the switching of the integrating threshold device can be varied. Such variations are discussed hereinbelow with respect to FIG. 3.

In the embodiments of FIGS. 1 and 2, there is no particular property required of the light source, such a coherency. However, as will be discussed hereinbelow with respect to multicolor embodiments, the light will be required in certain embodiments to contain predetermined color components.

Relating back to the mathematical analysis presented hereinabove, it is assumed for present purposes that each of the images is stored as $n \times n = N$ pixels in the digital form. The number N could be arbitrarily large without affecting the comparison speed. In this manner, the minimum and maximum transmittances are $t_{min}$ and $t_{max}$, respectively. In addition, the transparency, such as transparency sheet 17 in FIG. 1, contains M sets of stored images and their complementary images. Again, such images are stored in $n \times n$ pixels, as is the case for the subject image, with transmittances $T_{max}$ and $T_{min}$.

In the case where the $1^{th}$ reference image is exactly the same as the subject image, such that each pixel therein has the same transmittance as its corresponding pixel in the other image, then the total light input to the corresponding $1^{th}$ integrating threshold device, from Eq. 4, would be:

$$I_{in}^1 = I_0(N_w t_{min} T_{max} + N_c t_{max} T_{min})$$ Eq. 6 where the first term corresponds to the light passing through the subject image and the complement of the $1^{th}$ reference image, and the second term corresponds to the light passing through the complement of the subject image and the $1^{th}$ reference image. Values which equal and deviate from the lowest value set forth in Eq. 6 can be used as a measure of the closeness of the match between a subject image and any reference image. Such closeness may relate to the translation or rotation of a subject image relative to a reference image, as well as to the relative appearance of the images.

Figure 3:
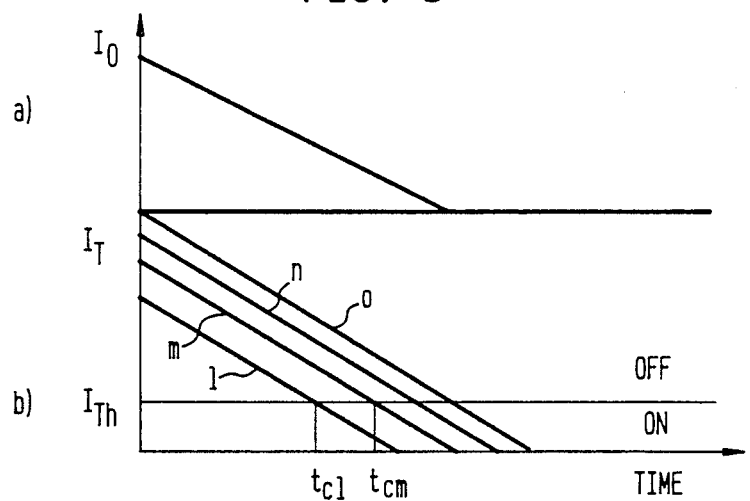
FIG. 3 is a graphical representation useful in illustrating the operation of an integrating threshold device in the context of the present invention.

FIG. 3 is a graphic representation of light amplitude plotted against time, for the purpose of illustrating the operation of an integrating threshold device. As shown in the figure, the time-varying light intensity, or the time-varying threshold value, as the case may be, is proposed herein to facilitate selection of the reference image which best matches the subject image, without requiring direct comparison between the output light from the various images. Referring to FIG. 1 for the moment, array 22 of integrating threshold devices 23 can be considered to contain M such devices, in correspondence with the number of stored reference images, on reference image transparency sheet 17. The effective threshold level, in the context of switching times, is adjusted using a threshold ramp which changes the times at which the magnitude of the output light (after passing through the subject and reference images) decays to a value which equals the threshold. Such a threshold ramp may illustratively be linear with time.

Of course, either the light level or the threshold value can be varied with time. In an embodiment of the invention where the integrating device consists of a lens which focuses the light on a phototransistor, circuitry which will be described hereinbelow is used to vary the trigger threshold. This is accomplished by comparing the voltage level of the phototransistor, which is a measure of light intensity, against a time-varying voltage level.

Referring once again to FIG. 3, $1_{th}$ represents the threshold light level above which an integrating threshold device is in an off state and below which it is in an on state. The graphical plot identified as (a) illustrates the monotonic decay of the light intensity. The graphical plot designated as (b) shows the values for various stored images. The lowest curve corresponds to that of the best match (the $1^{th}$ image). At time $t_{cl}$, the $1^{th}$ integrating threshold device switches while the rest of the integrating threshold devices are still off. Thus, the first device to switch points out the best matched image. Simple circuitry can be employed to detect this change in state, and designate the best matched image.

FIGS. 4-7 are schematic representations of relatively simple circuits which serve to vary a switching threshold linearly with time, whereby the first device to switch, for a constant input light level, would correspond to the best match. In this regard, therefore, the circuits in these figures represent alternatives to the time-varying light level which is plotted graphically in FIG. 3.

Figure 4:
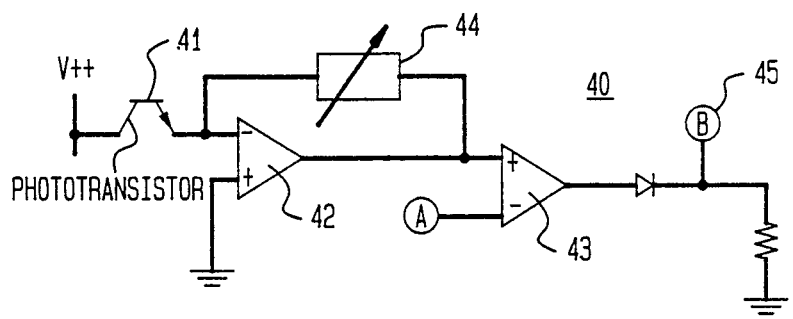
FIG. 4 is a schematic representation which shows one method of implementing photodetection and thresholding. This circuit is repeated for each photodetector.

FIG. 4 shows one method of implementing photodetection and thresholding. This circuit is repeated for each photodetector. V++, 41, 42, and 44 are a positive power supply, a phototransistor, an operational amplifier, and a resistor, respectively. This circuit converts signal current of the phototransistor to a signal voltage. The element designated as 43 is a further operational amplifier which acts as a comparator for the thresholding comparison between the voltage at terminal A and the signal voltage from the photodetector. The combination of a ramp signal received at terminal A, as will be discussed hereinbelow with respect to FIG. 6, and the photodetector output, gives the thresholding. The comparator output is connected to the ground via a diode and a resistor, so that when output is positive then the terminal B has a positive voltage. The terminals A and B should be connected to A in FIG. 6, and B in FIG. 5 and 7 respectively.

Figure 5:
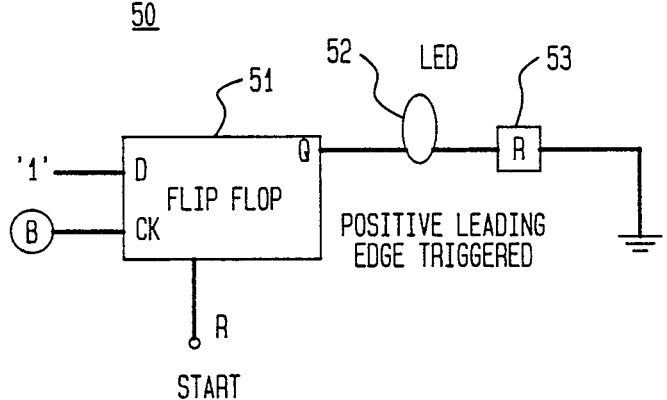
FIG. 5 is a schematic representation of a circuit for storing the occurrence of a threshold output. This circuit is also repeated for each photodetector.

FIG. 5 is a circuit for holding threshold output until resetting for a new comparison. The elements designated 51, 52 and 53 represent a D flip-flop, an LED, and a resistor for the LED, respectively. This circuit is designed with a positive leading edge triggered D flip-flop. The use of the LED is one method of identifying the comparison results. This circuit repeated for each photodetector.

Figure 6:
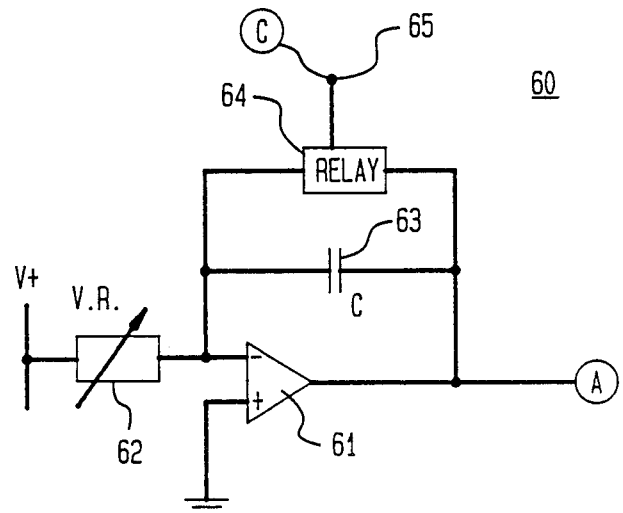
FIG. 6 is a schematic representation of a circuit for generating a ramp voltage.

FIG. 6 is a circuit for a ramp generator by integrating a constant current source and providing threshold voltage at A terminal. The elements designated as 61, 62, 63, 64, and 65 are an operational amplifier, a variable resistor, capacitor, relay and relay control respectively. Variable resistor 62 produces a constant current and its integration can be done when relay 64 is off.

Figure 7:
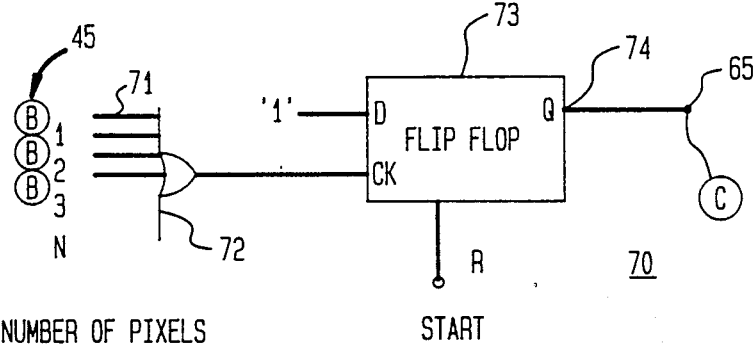
FIG. 7 is a schematic representation of a circuit to stop generation of the ramp voltage when the first threshold occurs.

FIG. 7 is a circuit for stopping integration when one of thresholded outputs goes high. Each photodetector-thresholding circuit has a thresholded output at B. Every output 45 is connected in OR gate 72. The OR gate output is connected to a D flip-flop 73 for holding this output until resetting for a new start. The output 74 is connected to 65 to control the relay. The reset control of both FIG. 5 and 7 are connected and used as a start control.

It is to be noted that the present invention is applicable to compare true-complement images when gray levels are present. One approach which might be considered to solving the gray level problem involves a normalized situation where the transmittance ranges from 0 to 1, and the complement value is defined as:

$$\bar{x} = 1 - x \qquad \text{Eq. 7}$$

Using this definition, the light which is collected from a perfectly matched pixel is:

$$I_c = I_0[x(1-x) + (1-x)x] = I_0[2x - 2x^2] \qquad \text{Eq. 8}$$

From a mismatched pixel of the subject image (x, 1−x) and reference (y, 1−y), the light collected is:

$$\begin{aligned} I_w &= I_0[x \cdot y + (1-x) \cdot (1-y)] \\ &= I_0(1 + 2xy - x - y) \end{aligned} \qquad \text{Eq. 9}$$

In order for this simple scheme to work, the output light is required to be minimum when $y = 1 - x$ (i.e., for the best match). If it is chosen that $y = 1 - x + \delta$, then it is evident that:

$$I_w = I_c - \delta(1 - 2x) \qquad \text{Eq. 10}$$

This, of course, means that $I_w$ can in general be smaller than $I_c$, and will therefore be ineffective for gray level identification.

However, a different definition of complementary transmission can be implemented. In such a scheme:

$$\bar{x} = \alpha/x \qquad \text{Eq. 11}$$

where it is assumed that the minimum transmittance x is not zero, but rather some finite value, and α is a constant. For the matched pixel, it is seen that:

$$I_c = I_0 x(\alpha/x) + I_0 x(\alpha/x) = 2I_0 \alpha \qquad \text{Eq. 12}$$

while for the mismatched pixel, one obtains:

$$I_w = I_0[x.y + \alpha^2/xy] \qquad \text{Eq. 13}$$

It is straightforward to see that $I_w$ is a minimum when $y = \alpha/x$ since:

$$\frac{dI_w}{dy} = 0 => x - \frac{\alpha^2}{xy^2} = 0 \text{ or, } y = \frac{\alpha}{x} \qquad \text{Eq. 14}$$

Since Eq. 14 represents the best match pixel, the present scheme will work. Thus, with a modified definition of complementary transmittances, analog signals can be recognized.

As indicated hereinabove, the present invention can be implemented in a two color scheme wherein the display of an image is not in a black and white transparency, but in a two color transparency. For example, the subject image would be in red on a green background, while the reference images would be in green, on a red background (i.e., in a complementary form). If a white light source is used in this specific illustrative embodiment, such that the green and red components of the white light source are equal, one does not need to prepare two images, since the red light sees the subject images and complement reference images while the green light sees the complement subject images and the true reference images. This property, which is inherent in a simple white light source, simplifies the image generation process. In a further embodiment of the invention, the subject image is not generated on a transparency, which is rather time consuming, but instead is generated on a television or similar screen. For example, the source transparency can be replaced by a light-emitting screen, and the memory, or reference images, in the form of a transparency, can simply be placed over the television screen. This permits a comparison to be achieved very quickly, on the order of a few microseconds.

Figure 8:
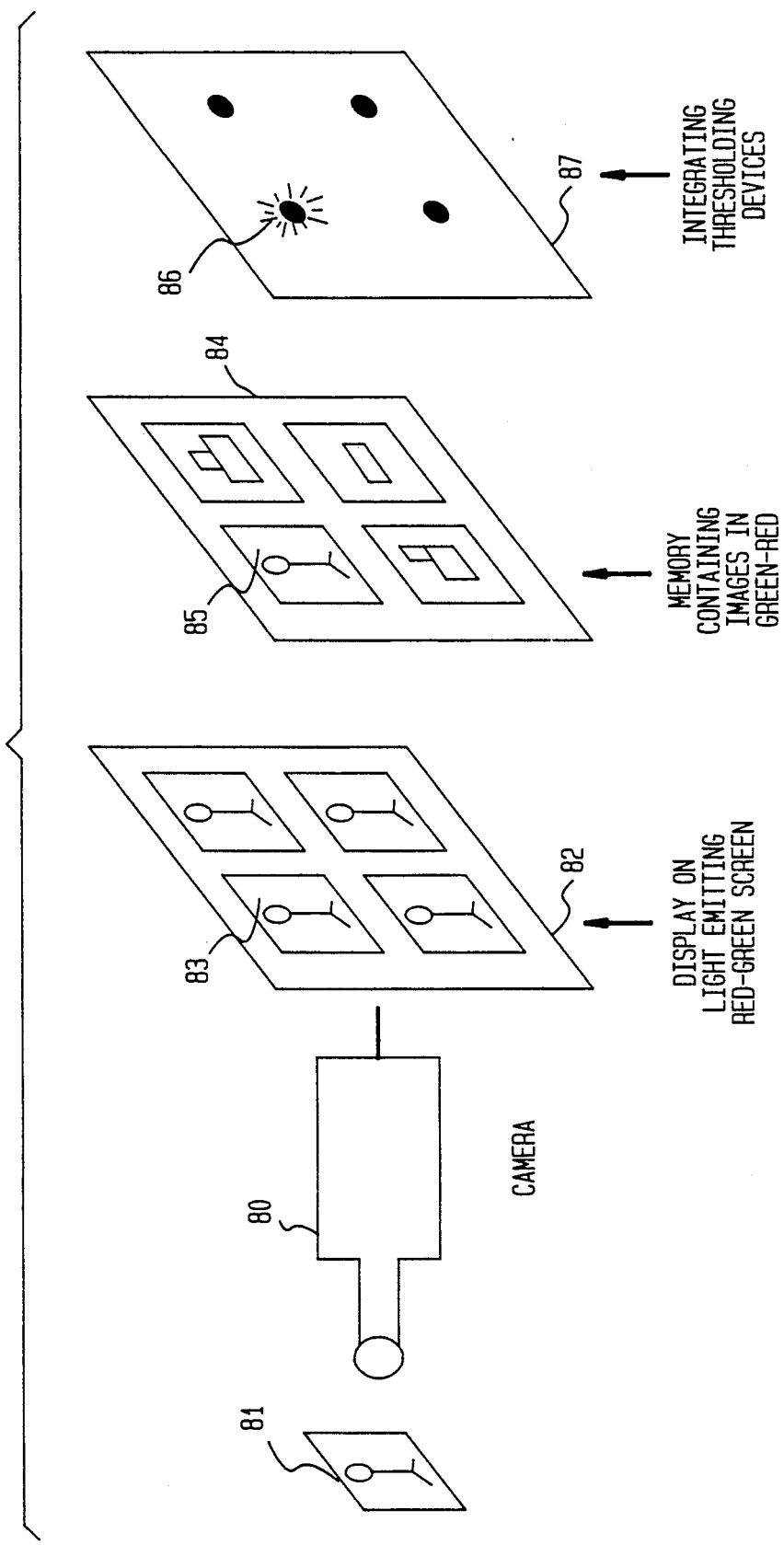
FIG. 8 is a simplified schematic representation of a system which utilizes a video camera to generate the subject image in a two-color system.

FIG. 8 is a simplified schematic representation of a system which employs a video camera 80 which is directed to receive the image of subject 81. As shown schematically in this figure, the output of video camera 80 is displayed on screen 82, which in this specific illustrative embodiment is a red-green screen. As shown, subject 81 is represented as subject image 83, which is replicated four times in this embodiment on screen 82. The multiply replicated subject images on screen 82 are compared against a plurality of reference images which are stored on a reference screen 84. In this embodiment, reference screen 84 is arranged to be of the green-red type, so as to become complementary in color with respect to subject screen 82. In addition, reference screen 84 may be a further video screen, or a transparency. The image could also be placed on a programmable transparency. Such transparencies could be replicated from electro-optical modulators and programmed via CCD's.

Reference image 85 on reference screen 84 represents the closest match to subject image 83. Accordingly, an integrating threshold device 86 on array 87 of integrating threshold devices will indicate the appropriate extrema corresponding to the closest match.

The present invention can be extended to detect edges present in an image. In such a case, the subject image and the reference image have the same information but are stored in the manner discussed hereinabove, e.g., in the two color scheme, the test image may be red-green, while the memory image would be green-red. Since the present scheme essentially subtracts the two images, a slight displacement of one image results in a parallel differentiation of the entire image. Thus, by shifting the images in various directions, the edges can be detected.

Figure 9:
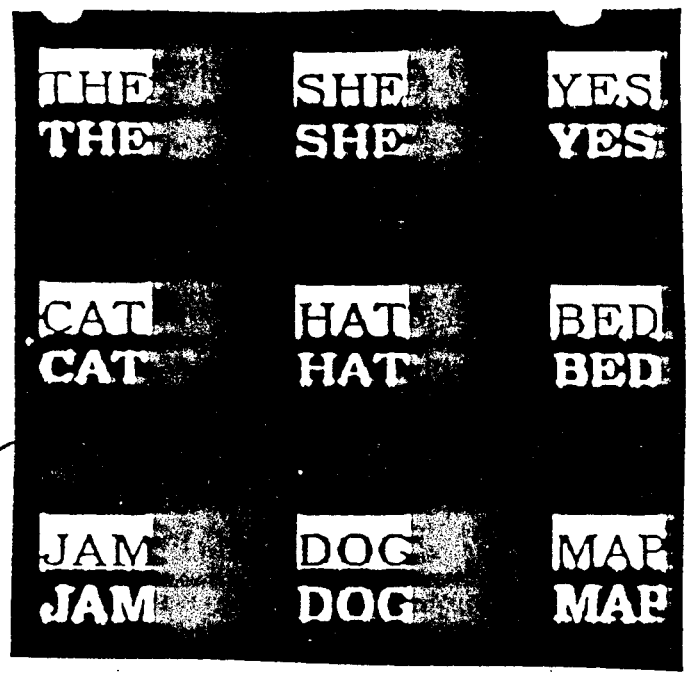
FIG. 9 is a representation of a plurality of stored images and their corresponding complement images.
Figure 10:
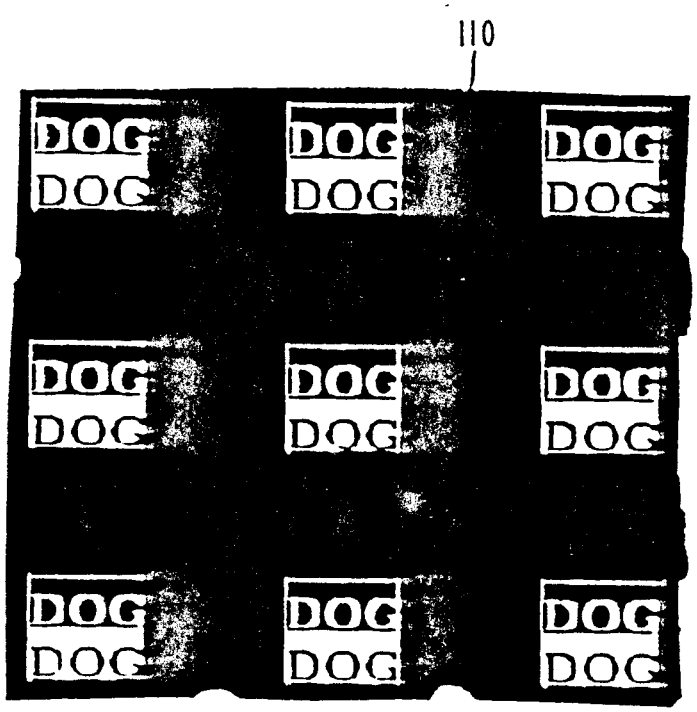
FIG. 10 is a representation of a subject image and its complement replicated multiple times.
Figure 11:
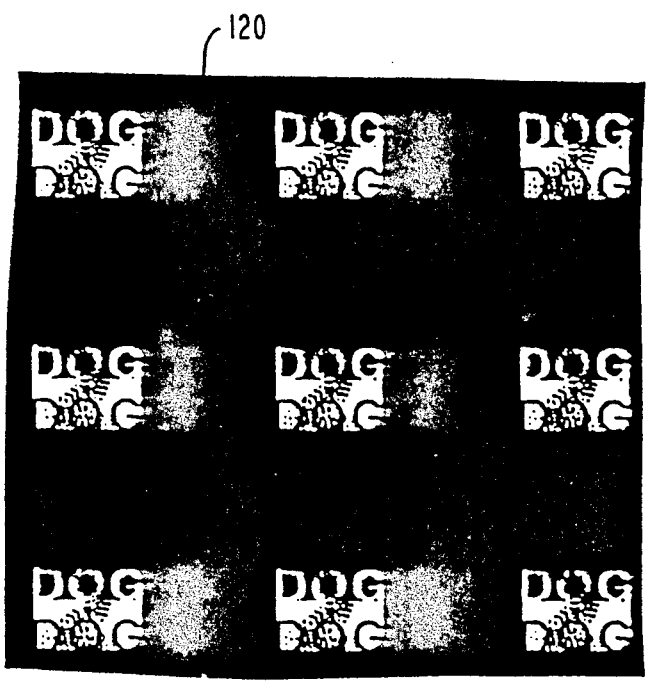
FIG. 11 is a representation of a transparency of a subject image, replicated multiple times. The subject image is not perfect but has a distortion on it as can be seen. The purpose is to demonstrate that the invention carries out the best match and does not require perfect matching to be effective.

FIG. 9 is a representation of a reference image transparency screen 100 having a plurality of reference images and their complements thereon. FIG. 10 is a representation of a subject image transparency screen 110, and FIG. 11 is a representation of a further subject image transparency screen 120.

Figure 12:
FIG. 12 is a representation of the light transmitted through the combination of the transparencies of FIGS. 9 and 10.
Figure 13:
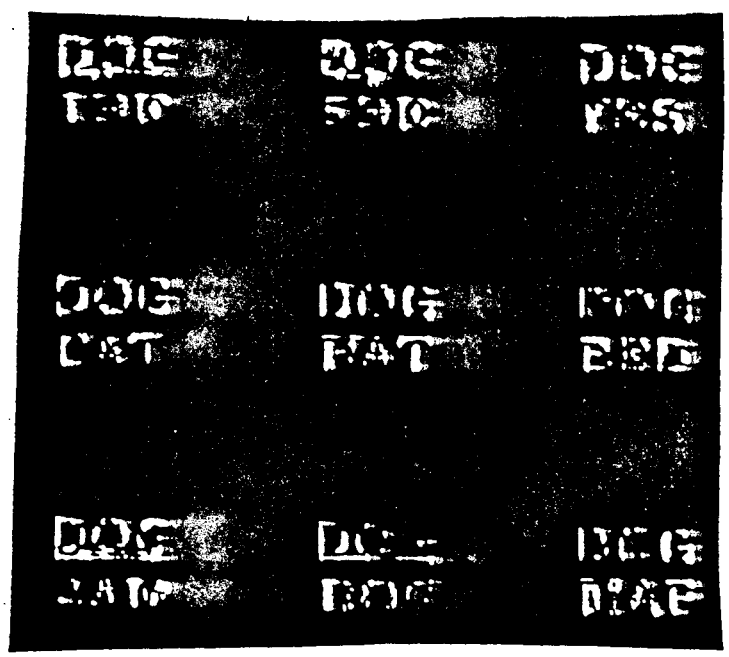
FIG. 13 is a representation of the light transmitted through the combination of the transparencies of FIGS. 9 and 11.

FIG. 12 is a representation of a comparison by direct super-position of the transparencies of FIGS. 9 and 10 in front of a light source. Slight displacement between screens 100 and 110 illustrate edges, particularly in the closest match of the bottom center image. FIG. 13 corresponds to a comparison between reference image transparency screen 100 and subject image transparency screen 120 of FIGS. 9 and 11, respectively. Again, the edges are detectable notwithstanding noise or other defects in the subject images of screen 120. In both cases it can be seen that the * closest matched image provides the minimum output light.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for comparing a subject pattern to be tested against at least one known pattern, the system comprising:
   light source means having a predetermined light output characteristic;
   first pattern storage means for storing the subject pattern to be compared;
   second pattern storage means for storing a complement of the subject pattern to be compared;
   third pattern storage means for storing a known pattern;
   fourth pattern storage means for storing a complement of the known pattern;
   photodetector means for receiving output light from said light source means; and
   threshold control means for controlling a trigger threshold, said threshold control means being coupled to said photodetector means, said threshold control means having integrator means for accumulating an electrical charge responsive to said photodetector means.

2. The system of claim 1 wherein said first, second, third, and fourth pattern means each comprise a respective transparency.

3. A method for ascertaining a closest match between a subject pattern and a reference pattern which is one of a plurality of reference patterns, the method comprising the steps of:
   optically aligning a positive image of the subject pattern, said positive image being formed of a first primary color on a background of a second primary color, with a negative image of one of the plurality of reference patterns, said negative image being formed of said second primary color on a background of said first primary color;
   propagating a light through said optically aligned positive image of the subject pattern and said negative image of said one of the plurality of reference patterns, said light being formed of components of said first and second primary colors;
   obtaining a measure of the magnitude of a primary color component of said light propagated through said optically aligned positive image of the subject pattern and said negative image of said one of the plurality of reference patterns;
   repeating said steps of optically aligning, propagating a light, and obtaining a measure, for each of said negative images of said plurality of reference patterns;
   further optically aligning a negative image of the subject pattern formed of said second primary color on a background of said first primary color with a positive image of one of the plurality of reference patterns formed of said first primary color on a background of said second primary color, said step of further optically aligning being performed simultaneously with said step of optically aligning;
   further propagating a further light through said optically aligned negative image of the subject pattern and said positive image of said one of the plurality of reference patterns, said step of further propagating being performed simultaneously with said step of propagating, said light and said further light forming a combined propagated light formed of substantially equal portions of said first and second primary colors;
   further obtaining a measure of the magnitude of a primary color component of said further light propagated through said optically aligned negative image of the subject pattern and said positive image of said one of the plurality of reference patterns;
   repeating said steps of further optically aligning, further propagating said further light, and further obtaining a measure, for each of said negative images of said plurality of reference patterns; and
   selecting as the closest match the one of said reference patterns corresponding to the positive and negative images which resulted in minimum light propagation in said steps of obtaining a measure and further obtaining a measure.

4. The method of claim 3 wherein said step of obtaining a measure comprises the step of varying the amplitude of said light.

5. The method of claim 3 wherein said step of obtaining a measure comprises the step of varying a trigger threshold.

6. The method of claim 3 wherein prior to performing said steps of optically aligning and further optically aligning, there is provided the step of generating said positive and negative images of the subject pattern on a video screen.

* * * * *